United States Patent [19]
Torii et al.

[11] 3,722,635
[45] Mar. 27, 1973

[54] AUTOMOTIVE WHEEL BRAKE MECHANISM FITTED WITH AUTOMATIC BRAKE GAP ADJUSTER

[75] Inventors: Tatsumi Torii; Haruo Miyajima, both of Kariya, Japan

[73] Assignee: Aisin Seiki Kabushiki Kaisha, Kariya, Aichi Pref., Japan

[22] Filed: Jan. 29, 1971

[21] Appl. No.: 111,062

[30] Foreign Application Priority Data

Feb. 2, 1970 Japan ................................45/9448
Feb. 2, 1970 Japan ................................45/9449

[52] U.S. Cl. ......188/79.5 P, 188/106 A, 188/196 BA
[51] Int. Cl. ..............................................F16d 65/54
[58] Field of Search......188/79.5 B, 79.5 P, 79.5 GC, 188/79.5 GT, 106 A, 196 BA

[56] References Cited

UNITED STATES PATENTS

| 3,221,842 | 12/1965 | Shampton | 188/196 BA X |
| 3,360,083 | 12/1967 | Ayers | 188/196 BA X |
| 3,526,301 | 9/1970 | Ayers | 188/196 BA X |

FOREIGN PATENTS OR APPLICATIONS

| 1,191,320 | 5/1970 | Great Britain | 188/79.5 P |

*Primary Examiner*—Duane A. Reger
*Attorney*—Sughrue, Rothwell, Mion, Zinn & Macpeak

[57] ABSTRACT

This invention relates to a wheel braking mechanism comprising an automatic brake gap adjuster, which is especially advantageous for use in automotive service.

A representative conventional automotive wheel brake assembly fitted with an automatic brake gap adjuster comprises generally: a rotatable brake drum adapted for unitary revolution with a wheel to be braked of an automotive vehicle; a backing plate fixedly mounted on a stationary part of an axle for said wheel; a pair of brake shoes pivotably mounted on said backing plate and expandable towards and against said drum; an expandable hydraulic actuator mounted on said backing plate and adapted for engaging with one end of each of said shoe; a stationary anchor mounted on said backing plate and adapted for engaging with other end of each of said shoes; back spring means adapted for release of pressure contact of said brake shoes with said brake drum; and an automatic brake gap adjuster arranged in proximity of said hydraulic actuator and between said brake shoes.

The characterizing feature of the invention resides in the provision of a parking lever pivotably mounted with its one end on one of expandable; mechanical expansion means for expanding said shoes and in cooperation with said parking lever; first spring means provided between automatic gap adjuster and either of said shoes; screw shift means; a ratchet wheel means, said screw shift means and said ratchet wheel means being comprised in said automatic adjuster; and second spring means one end of which is operatively connected with either of said shoes, said second spring means providing its force in actuating direction of said automatic adjuster.

6 Claims, 5 Drawing Figures

INVENTORS
TATSUMI TORII
HARUO MIYAJIMA

BY Sughrue, Rothwell, Mion, Zinn & Macpeak
ATTORNEYS

AUTOMOTIVE WHEEL BRAKE MECHANISM FITTED WITH AUTOMATIC BRAKE GAP ADJUSTER

This invention relates to a wheel braking mechanism comprising an automatic brake gap adjuster, which is especially advantageous for use in automotive service.

Conventional various automatic brake gap adjusters are known per se in the automotive engineering field. A first representative kind of the gap adjuster is arranged in the hydraulic actuator adapted for actuation of the hydraulically operated service brake. A second representative type of the gap adjuster is arranged in a close cooperational relationship with a lateral toggle member arranged between a pair of the brake shoes.

Especially in the latter type of the automatic brake gap adjuster, an overdue reaction transmitted from the side of the brake shoes to the automatic gap adjuster will result frequently in the breakage thereof. An overdue or excess gap correction may frequently be feared in such cases.

The adjuster comprises a ratchet wheel as a main working part and fitted with screw connection with a certain of other force-transmitting member cooperating with the brake shoe. Rust or similar objectional causes will invite an increase of the rotational resistance of the gap correction. An overdue and prolonged application of the service or parking brake will invite frequently a mechanical deformation of the brake drum cooperating with the brake shoes, and such drum distorsion will disturb the required correct brake gap adjustment.

The main object of the present invention is to provide an automotive wheel brake mechanism comprising an automatic brake gap adjuster, capable of obviating substantially the aforementioned various conventional drawbacks.

It is a further object of the invention to provide a automotive wheel brake mechanism of the above kind, wherein said adjuster is capable of operating even in a simultaneous operation both of the service-and the parking brake.

In order to fulfil the aforementioned objects, the characterizing feature of the invention resides in the provision of: a parking lever pivotably mounted with its one end on one of expandable; mechanical expansion means for expanding said shoes and in cooperation with said parking lever; first spring means provided between automatic gap adjuster and either of said shoes; screw shift means; a ratchet wheel means said screw shift means and said ratchet wheel means being comprised in said automatic adjuster; and second spring means one end of which is operatively connected with either of said shoes, said second spring means providing its force in actuating direction of said automatic adjuster.

These and further objects, features and advantages of the present invention will become more apparent when read the following detailed description thereof by reference to the accompanying drawings illustrative substantially of two preferred embodiments of the invention.

Figure 1:
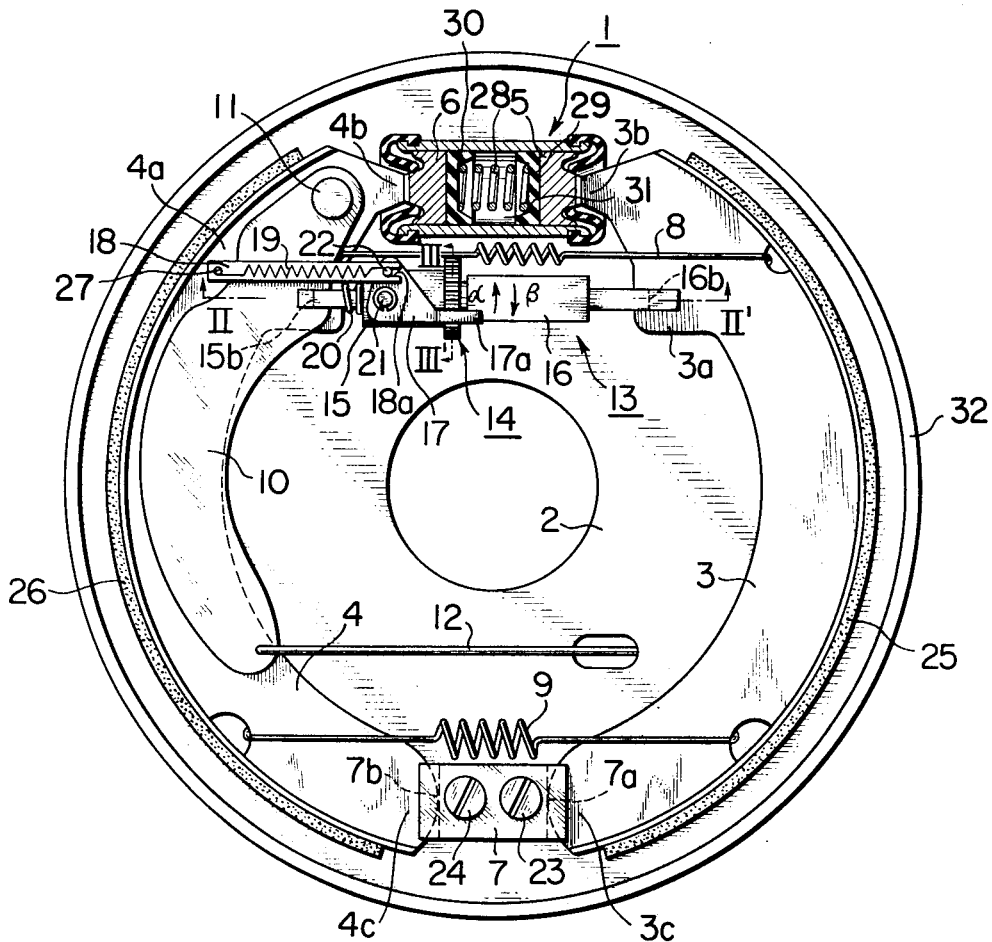
FIG. 1 is a front view of a first embodiment of the invention.
Figure 4:
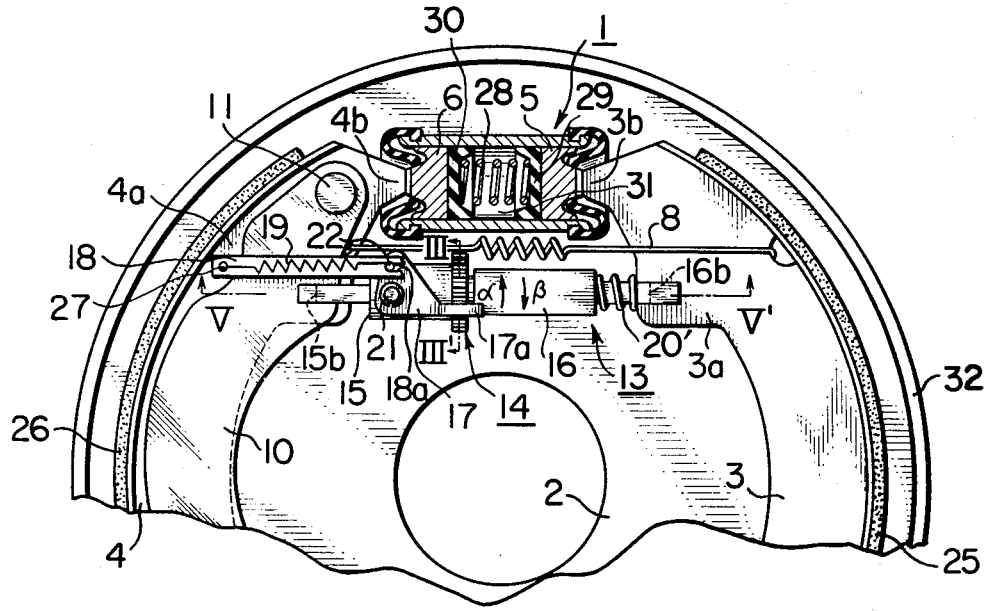

FIG. 4. is a similar view to FIG. 1, illustrative of a second embodiment of the invention.

Figure 2:
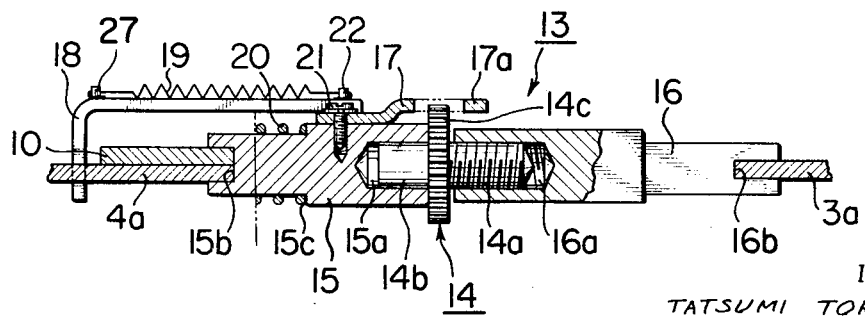
FIG. 2 is a sectional view taken substantially along a section line II—II shown in FIG. 1.
Figure 5:
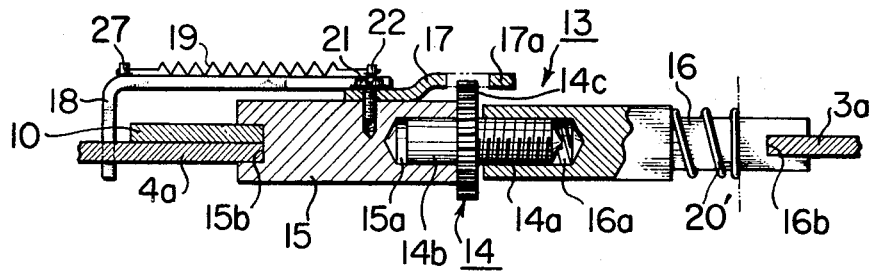

FIG. 5 is a similar view to FIG. 2 substantially taken along a section line V—V shown in FIG. 4.

Figure 3:
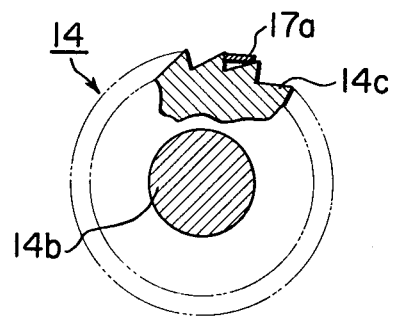
FIG. 3 is a sectional view taken substantially along a section line III—III shown in FIG. 1.

Referring now to FIGS. 1–3 of the drawings, numeral 1 represents an open-ended hydraulically operated wheel brake cylinder 1 fixed on a stationary and rigid backing plate 2 and provided with a pair of opposed pistons 5 and 6 slidably mounted therein. First shoe 3 and second shoe 4 are kept in cooperating condition at their respective upper ends 3b and 4b with outer ends of the expandable pistons 5 and 6 in the manner of tongue-and-groove connections, while the respective lower ends 3c and 4c of the shoes 3 and 4 are kept in pressure engagement with end grooves 7a and 7b formed on a stationary anchor 7 which is fixedly mounted on the backing plate 2 by means of set screws 23 and 24. The shoe ends 3c and 4c are adapted for acting as pivots for the respective shoes 3 and 4 and slidable relative to the stationary anchor, as occasion may desire, as will be more fully described hereinafter. These shoes 3 and 4 are fitted rigidly with respective friction elements 25 and 26 adapted for braking cooperation with the inside wall surface of a rotatable cylindrical brake drum 32.

First and second return springs 8 and 9 are bridged between the first and second brake shoes 3 and 4 at a proximity of the upper ends and the lower ends of the both shoes and acting in the contracting direction thereof.

Numeral 10 denotes a lever the upper end of which is pivotably mounted at 11 on the upper end of second shoe 4. At an intermediate point of the lever 10 in proximity to its pivot 11, this lever is kept in cooperating relationship by means of a tongue-and-groove connection with the left hand end of an automatic gap adjuster assembly generally and most clearly shown at 13 in FIG. 2. At the lower end of lever 10, it is connected fixedly with the left hand end of a wire 12 the right hand end of which is connected with a conventional parking or emergency brake lever, although not shown on account of its very popularity.

The automatic brake gap adjuster 13 comprises a ratchet wheel 14 formed integral at its center with a threaded pin 14a and a plain pin 14b. A motion-transmitting member 16 is formed with female threads and kept in screw connection with the pin 14a, while the outer end of the member 16 is kept in tongue-and-groove connection at 3a with the first shoe 3. The plain pin 14b is kept in relatively turnable connection with a further motion-transmitting member 15 at 15a the outer or left hand end of which is kept in tongue-and-groove connection at 4a and 10a commonly with said second shoe 4 and said lever 10. An adjusting lever 17 is pivotably mounted at 21 on the member 15. A connecting member 18 is pivotably mounted at its outer or left hand end on second shoe 4, while the inner or right hand end of the connector 18 is connected with the adjusting lever 17 by means of a pin-and-fork connection shown at 22 the pin member thereof and the pivot pin 27 studded on the connecting member 18 and passing through the left hand end of said connector 18 for the formation of said pivot connection between the both are bridged by a resilient spring 19 acting as one of the members necessary for the cooperation between the adjusting lever 17 and connecting member 18.

A compression spring 20 is provided between a shoulder 15c of the motion-transmitting member 15 and second shoe 4. Plain pin part 14b of the ratchet assembly is received in an axial bore 15a of the member 15. At the left hand end of the member 15, there is formed with a recess so as to form the related tongue-and-groove connection with the members 4 and 10. At the right hand end of the member 16, there is formed with a recess 16b so as to provide the tongue-and-groove connection with the first shoe 3.

The adjusting lever 17 is made resilient and its tip end 17a is kept in meshing with one of the teeth 14c formed on the ratchet wheel. The groove formed at the right hand end of connector 18 is shown at 18a.

Thus, it will be seen from the foregoing that an axial movement of connector 18, will be transmitted through said adjuster spring 19 to said adjusting lever 17 which is brought into pivotal rotation about its pivot pin 21 in one or another direction, depending upon the direction of said axial movement. The provision of spring 20 will act resiliently for separating the upper end 4b of second shoe 4 from the related motion-transmitting member 15.

The hydraulic chamber 31 provided within the interior of cylinder 1 and defined between two opposite hydraulic pressure is hydraulically connected through a port, not shown, and a connecting piping, not shown, to a conventional master cylinder, again not shown. Thus, hydraulic pressure will be conveyed from the master cylinder to the chamber 31 when a foot-operated or the like pedal brake pedal is operated and the master cylinder is thereby energized.

A compression spring 28 is provided in the hydraulic chamber 31 and abuts through respective sealing caps 29 and 30 against the respective inner ends of the expandable pistons 5 and 6.

The operation of the first embodiment so far shown and described is as follows:

When the brake pedal, not shown, is depressed and the master cylinder, not shown, is actuated, pressure oil is conveyed therefrom to the hydraulic chamber 31, thereby the pistons 5 and 6 being moved outwards to expand. Therefore, motion is transmitted to the upper ends 3b and 4b of shoes 3 and 4, so as to perform respective shoe-expanding motions with their lower ends 3c and 4c as pivots. In this way, the respective friction 25 and 26 are brought into braking contact with the inside wall surface of the cylindrical brake drum 32. In this course, the automatic gap adjuster 13 is urged by spring 20 to move sightwards in FIG. 1, thereby following after the expanding movement of first shoe 3, while the connector 18 is moved leftwards to follow after the expanding movement of second shoe 4. By these relative movements, the adjusting lever 17 is subjected to a leftward pull by adjuster spring 19 and caused to rotate about pivot pin 21 in counter clockwise direction shown by an arrow alpha, thereby the pawl end 17a of lever 17 being brought into a pivotal sliding motion on the ratchet teeth 14c and finally caused to engage with a certain advanced tooth valley. When the brake is released, lever 17 is caused to pivot under the influence of the backing spring 8 in the opposite direction shown by arrow beta to the original position.

Now it is assumed that the gap between the inside drum wall surface and the friction element 25 or 26 is larger than a predetermined value, and the brake pedal is depressed as before to invite a service braking. The shoe-expanding operation is carried into effect as before, and the adjusting lever 17 is brought into pivotal movement about its pivot pin 21 a larger angle than expected normally, and in the alpha direction as before. Therefore, ratchet wheel 14 is rotated partially in the same direction alpha, thereby the overall length of the automatic adjuster being increased by the threaded engagement of male screw 14a with female threaded part 16a in an extending direction. Therefore, the brake gap is adjusted correspondingly to the prescribed value. When the service braking is released, the pawl part 17a of adjusting 17 is brought into meshing with the next advanced one of ratchet teeth 14c under the action of backing spring 8.

When the driver pulls the parking or emergency brake lever, not shown, the wire 12 is subjected to a rightward pull in FIG. 1, so as to rotate the lever 10 about its pivot pin 11 in counter clockwise direction. Thus, motion will be transmitted from lever 10 through adjuster unit 13 to first brake shoe 3 so that the latter is urged to expand. Reaction will be transmitted from first shoe 3 to second shoe 4 which is thereby urged to expand. At the same time, the connecting member 18 is moved leftwards by the expanding movement of second shoe 4, resulting in the spring 19 causing a counter clockwise pivotal movement of the lever 17, or in alpha direction around pivot pin 21. Therefore, the pawl part 17a of said lever 17 will slide along the ratchet teeth 14c and be brought into engagement with a certain advanced tooth valley of the ratchet wheel 14.

When the parking brake is released, the automatic brake gap adjuster 13 is returned to its original or prescribed position under the influence of backing spring 8 as in the case of the service brake release mentioned hereinbefore.

If the brake gap should exceed a predetermined certain value, and actuation of the parking brake will cause the adjusting lever 17 in alpha direction over the predetermined pivotal value and the ratchet wheel 14 will be rotated to a correspondingly increased degree over the allotted value.

It should be noted that the spring force at 19 is selected to overcome the screw resistance acting at the mating threads 14a and 16a under the influence of backing springs 8 and 9. Therefore, in the course of a brake gap adjusting operation, the overall length of the gap adjuster can be extended so as to correct an overdue brake gap.

If an excess or extended parking brake effort be applied through the brake shoes 3 and 4 and their friction elements 25 and 26 to the brake drum 32, the latter may be disadvantageously distorted and its influence could be taken into account in the automatic brake gap correction. This conventional drawback can be remedied in the case of the present invention in the following way.

When the parking brake application is continued to make under these conditions more intense reaction will be transmitted reversedly from the drum 32 to the brake shoes 3 and 4 so that the screw or friction resistance between 14a and 16a may be increased correspondingly so that a forced rotational movement of ratchet wheel 14 by the pivotal movement of adjusting lever 17 will become correspondingly difficult. In such case, the spring 19 will become extended and the drum distortion will be prevented from inclusion into the gap-correcting operation.

It may be well understood from the foregoing that even in the case of a simultaneous actuation of the service brake and the parking brake, the automatic brake adjuster 13 can also be brought into actuation when so desired.

In a modified arrangement from the first embodiment, although not shown, the spring force at 19 is selected normally not so as to overcome the rotational resistance of ratchet wheel 14 under the action of backing spring 8.

In this modified arrangement, when the parking brake is applied, the lever 10 is also pivoted in counter clockwise direction in FIG. 1 and the both brake shoes are urged in their brake applying direction as before. Connecting member 18 follows, again in this case, after the expanding movement of second shoe 4 and the lever 17 tries under action of spring 19 to rotate the ratchet wheel 14 in alpha direction. In this stage of operation, however, the combined action of springs 8 and 9 are acting upon the automatic adjuster 13 which increases the rotational resistance of ratchet wheel 14 so that the connector 18 will move leftwards in FIG. 1 with adjuster spring 19 being further tensioned, and with the pawl part 17a of adjusting lever 17 being kept in meshing with a tooth 14c on the ratchet wheel 14. Therefore, it will be seen that the initial spring tension at 19 is so selected that it does not overcome the rotational resistance of ratchet wheel 14 caused by the combined action of spring 8, 9 and 20.

When the service or hydraulic brake is actuated, the both brake shoes are urged to expand against the brake drum 2a. In this case, first transmission member 15, ratchet wheel 14 and second transmission member 16 will follow after the expanding movement of first brake shoe 3 under the influence of spring 20, while force is transmitted from second shoe 4 through connector 18 and adjuster spring 19 to adjusting lever 17 which tries to turn the ratchet wheel 14 in alpha direction in FIG. 1. In this case, since the combined action of return springs 8 and 9 is not applied on the automatic adjuster 13, and the pawl part 17a of lever 17 is kept in engagement with one of the ratchet teeth 14c, the ratchet wheel 14 sill provide rather smaller rotational resistance and is easy to turn for necessary gap correction.

Next, considering such case that the service brake is applied while the parking brake has already been applied. The application of the parking brake will result in a further tensioning of the adjuster spring 19.

When the service brake is actuated under these operating conditions, the combined action of return springs 8 and 9 will applied upon the first and second pistons 5 and 6 and the automatic adjuster 13 will affected upon exclusively by the spring 20. Therefore, the rotational resistance of ratchet wheel becomes lesser and the adjusting lever 17 will act upon the wheel to rotate under the action of adjuster spring 19, thereby the adjuster resulting in a corresponding prolongation of its overall length for performing the required brake gap adjusting job.

In a further modification from the first embodiment, representing a second embodiment shown in FIGS. 4 and 5, the connector 18 may be pivoted on the second brake shoe 4 and the compression spring 20 has been inserted as at 20' between the adjuster 13 and first shoe 3. In this second embodiment, it may well be understood from the foregoing and without further detailed analysis that the desired brake gap adjusting operation can be performed exclusively during an actuation of the service brake.

Although not shown, the rotatable brake drum 32 is connected mechanically as conventionally with the wheel to be braked, for unitary rotation therewith, while the backing plate is rigidly mounted on axle housing or the like stationary part of an automotive vehicle comprising said wheel.

The embodiments of the invention in which an exclusive property or privilege is claimed are defined as follows:

1. A wheel brake mechanism fitted with an automatic brake gap adjuster for an automotive vehicle comprising in combination:

a rotatable brake drum adapted for unitary revolution with an automotive vehicle wheel to be braked;

a backing plate fixedly mounted on a stationary part of said vehicle;

a first and a second brake shoe pivotally mounted on said backing plate and expandable towards and against said drum;

an expandable hydraulic actuator mounted on said backing plate and adapted for engagement with one end of each of said shoes;

a stationary anchor mounted on said backing plate and adapted for engagement with the other end of said shoes;

return spring means operatively connected to each of said shoes and adapted for release of pressure contact of said brake shoes with said brake drum;

an automatic brake gap adjuster unit located in proximity to said hydraulic actuator between said brake shoes in operative engagement therewith, said adjuster unit comprising first and second expansible members, and adjusting lever, and ratchet wheel means actuated by said adjusting lever for expanding said first and second members between said brake shoes;

a parking lever having one end pivotably mounted on one of said brake shoes, said parking lever operatively engaging one end of said adjuster unit for expanding said brake shoes in cooperation with said adjuster unit;

first spring means provided between said adjuster unit and either of said brake shoes;

second spring means having one end operatively connected to one of said brake shoes and the other end operatively connected to said adjusting lever to rotate said ratchet wheel for adjusting the clearance between said brake shoes and said brake drum.

2. An automatic wheel brake mechanism as claimed in claim 1, wherein said first member has a cavity formed therein, said cavity having female threads, said ratchet wheel means having an elongated portion formed with male threads thereon corresponding to said female threads of said first member, said adjusting lever being pivotably mounted on said adjuster unit and having a pawl portion adapted for engagement with ratchet teeth on said ratchet wheel means, whereby a screw shifting operation between said male threads and said female threads is attained.

3. Automotive wheel brake mechanism as claimed in claim 2 wherein said first spring means is compressed between said second shoe and said adjuster, and said second spring means is selected to have a larger spring force than that for overcoming the rotational resistance of said screw shift operation influenced by said return spring means.

4. Automotive wheel brake mechanism as claimed in claim 2, wherein said first spring means is compressed between said second shoe and said automatic adjuster and said second spring means is so selected to have a smaller spring force than that for overcoming the rotational resistance of said screw shift operation influenced by said return spring means.

5. Automotive wheel brake mechanism as claimed in claim 2, wherein said first spring means is compressed between said first shoe and said automatic adjuster and said second spring means is so selected to have a larger spring force than that for overcoming the rotational resistance of said screw shift operation influenced by said back spring means.

6. Automatic wheel brake mechanism as claimed in claim 2 wherein said first spring means is compressed between said first shoe and said automatic adjuster and said first spring means is so selected to have a smaller spring force than that for overcoming the rotational resistance of said screw shift operation influenced by said back spring means.

* * * * *